United States Patent [19]

Mukohyama

[11] Patent Number: 5,700,857
[45] Date of Patent: Dec. 23, 1997

[54] FLAME RESISTANT POLYESTER RESIN COMPOSITION

[75] Inventor: Atsushi Mukohyama, Yokohama, Japan

[73] Assignee: E. I. Du Pont de Nemours and Company, Wilmington, Del.

[21] Appl. No.: 666,501
[22] PCT Filed: Dec. 28, 1994
[86] PCT No.: PCT/US94/14886
§ 371 Date: Jun. 25, 1996
§ 102(e) Date: Jun. 25, 1996
[87] PCT Pub. No.: WO95/18179
PCT Pub. Date: Jul. 6, 1995

[30] Foreign Application Priority Data

Dec. 28, 1993 [JP] Japan .................................. 5-334726

[51] Int. Cl.$^6$ ............................ C08K 5/10; C08K 5/06; C08K 5/05
[52] U.S. Cl. ..................... 524/290; 524/308; 524/376; 524/377; 524/378
[58] Field of Search ........................... 528/301, 307; 524/911, 910, 378, 290, 308, 376, 377

[56] References Cited

U.S. PATENT DOCUMENTS

| 4,548,978 | 10/1985 | Garrison, Jr. ............................ 524/314 |
| 4,558,085 | 12/1985 | Lee ........................................... 524/299 |
| 4,713,407 | 12/1987 | Bailey et al. ............................ 524/109 |
| 4,753,980 | 6/1988 | Deyrup ..................................... 524/369 |
| 4,914,145 | 4/1990 | Tohdoh et al. .......................... 524/245 |
| 4,954,542 | 9/1990 | Bohen et al. ............................ 524/89 |
| 5,624,987 | 4/1997 | Brink et al. ............................ 524/290 |

Primary Examiner—Veronica P. Hoke
Attorney, Agent, or Firm—Charles E. Krukiel

[57] ABSTRACT

A polyester resin composition made of a polyester resin containing a polyalkylene oxide soft segment component, a plasticizer, a crystallization promoter, and a brominated flame retardant is developed, said composition having good flame resistance and mechanical properties.

4 Claims, No Drawings

FLAME RESISTANT POLYESTER RESIN COMPOSITION

BACKGROUND OF THE INVENTION

This invention concerns a type of flame resistant polyester resin composition characterized by the fact that it has a high productivity and can be used preferably in manufacturing terminal blocks, coil bobbins, and other precision parts in the electrical/electronic field for which the surface appearance is important.

In the conventional scheme, as a type of polyethylene terephthalate resin composition with improved productivity arising from an increased crystallization rate while the mechanical characteristics are maintained, a polyethylene terephthalate resin composition is prepared by adding a polyalkylene oxide soft segment as well as a certain type of plasticizer and nucleating agent Japanese Kohyo Patent No. Sho 61[1986]-501269). When using this type of polyethylene terephthalate resin composition in a molding machine that has its temperature water-regulated at a mold temperature of 90° C. or less, the molding formed has a fully crystallized surface, as indicated by good surface gloss.

However, when this type of polyethylene terephthalate resin composition is used to form moldings used as precision parts in the electrical/electronic field for which the surface appearance is important, flame resistance is a problem. Also, the impact strength and heat shock property can be improved.

The purpose of this invention is to provide a type of flame resistant polyester resin composition that can be used preferably in manufacturing precision parts in the electrical/ electronic field for which surface appearance is important and for which there is a high demand on the impact strength and heat shock property. The crystallization rate of the composition is high and low-temperature molding can be performed using it; it also has excellent mechanical characteristics. As a result, thin-film strength and the resin flow characteristics of the thin-film portion are improved and pin retaining strength can be increased.

In order to realize the aforementioned purpose, this invention provides a type of flame resistant polyester resin composition characterized by the fact that this type of flame resistant polyester resin composition is made principally of the following components: A. 20–80 wt % of a polyester matrix resin prepared for 1–100 parts by weight by adding 1–10 parts by weight of a polyalkylene oxide soft segment component to 99–90 parts by weight of a polyester resin, with the polyester resin selected from the group consisting of polyethylene terephthalate, polyethylene terephthalate/ polybutylene terephthalate mixture, polyethylene terephthalate/polybutylene terephthalate copolymer, and mixtures thereof (the mixtures and copolymers preferably contain at least 70 wt % ethylene terephthalate units), and with the polyalkylene oxide soft segment component having a molecular weight of 200–3250; B. 5–25 wt % of a brominated flame resistant agent; C. 1–10 wt % of a plasticizer represented by the formula:

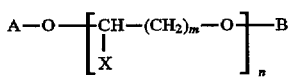

$m = 1-3$
$n = 4-25$ $A = C_{1-10}$ alkyl, acyl, or aroyl group
$B = C_{1-10}$ alkyl, acyl, or aroyl group
$X = H, CH_3, C_2H_5$ and D. 1–10 parts by weight per hundred parts the matrix resin A of a crystallization promoter derived from the group consisting of (a) at least one source of carboxyl groups selected from the group consisting of hydrocarbon acids containing 7–54 carbon atoms and organic polymers having at least one carboxyl group attached thereto, (b) at least one source of metal ions capable of reacting with the carboxyl groups of (a) selected from the group consisting of sodium and potassium ion sources, where the concentration of said metal in said matrix resin (A) is at least 0.01 weight percent, (c) inorganic alkali metal salts, and (d) mixtures of (a), (b), and (c).

The resin composition of this invention contains polyester matrix resin A, which is prepared by adding 1–10 parts by weight of a polyalkylene oxide soft segment component having a molecular weight of 200–3250 to 100 parts by weight of a polyester resin.

The polyester resin of this invention is selected from the group of polyethylene terephthalate, polyethylene terephthalate/polybutylene terephthalate mixture, polyethylene terephthalate/polybutylene terephthalate copolymer, and their mixtures (the mixtures and copolymers, should contain at least 70 wt % ethylene terephthalate units). Among them, polyethylene terephthalate having an intrinsic viscosity of at least about 0.4 at 30° C. in a 3:1 (by volume) mixture of methylene chloride and trifluoroacetic acid is preferred.

The preferred type of polyalkylene oxide soft segment component is polyethylene oxide.

The polyester and the polyalkylene oxide soft segment component may be simply mechanically blended with each other, or the polyalkylene oxide soft segment component may be chemically bonded to the polymer chains of the polyester resin. It is also possible to blend the polyester that chemically bonded with polyester resin and the polyalkylene oxide soft segment component. When a polyethylene terephthalate/polybutylene terephthalate mixture and/or polyethylene terephthalate/polybutylene terephthalate copolymer is used, it is possible to perform an addition reaction of the polyethylene terephthalate to the polybutylene terephthalate/polyalkylene oxide copolymer, or to perform a direct addition reaction of the polyalkylene oxide to a polyethylene terephthalate/polybutylene terephthalate copolymer, so that direct polymerization is performed for the polyethylene terephthalate, polybutylene terephthalate, and polyalkylene oxide, with the polyalkylene oxide being bonded in the polymer. The molecular weight of the polyalkylene oxide used should be 200–3250, preferably 600–1500. In any method, the amount of the polyalkylene oxide soft segment component added should be 1–10 parts by weight with respect to 100 parts by weight of the polyester resin. If this amount added is less than 1 part by weight, it is impossible to realize the crystallization rate and molding temperature needed for the synergistic effect with plasticizer C. On the other hand, when the aforementioned amount is greater than 10 parts by weight, it is impossible to maintain the same mechanical characteristics as those of the polyethylene terephthalate.

The polyester resin composition of this invention contains 20–80 wt % (with respect to the total weight of the composition) of polyester resin A, which is prepared by adding 1–10 parts by weight of the polyalkylene oxide soft segment component with molecular weight of 200–3250 to 100 parts by weight of the polyester resin.

The brominated flame resistant agent B used in this invention may be any of the following conventional types of brominated flame retardant, such as brominated phthalic acid ester, tetradecabromodiphenoxybenzene, polydibromostyrene, polytribromostyrene, polypentabromostyrene, etc. Its content should be 5–25 wt % with respect to the weight of the resin composition. If the content is less than 5 parts by weight, the flame resistance may not become V-O (UL94). On the other hand, if the content is greater than 25 wt %, the mechanical characteristics of the resin may be degraded. This is also undesired. Both low molecular weight flame retardants (such as Pyrochek LM) and high molecular weight flame retardants (such as Pyrochek 68 PB) may be used in the present invention.

Plasticizer C contained in the polyester resin composition in this invention is represented by the formula:

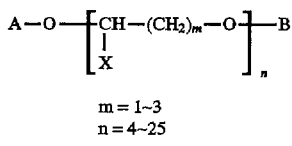

m=1–3
n=4–25

A=$C_{1-10}$ alkyl, acyl, or aroyl group
B=$C_{1-10}$ alkyl, acyl, or aroyl group
X=H, $CH_3$, $C_2H_5$.

For preferred plasticizers, m is 1, n is 4–14, and X represents H in the above formula; more preferably, m is 1, n is 7–13, X represents H, A represents a $C_8$ acyl or methyl group, and B represent a $C_8$ acryl group in the aforementioned formula. Such plasticizers are described in U.S. Pat. No. 4,548,978, column 6. Particularly preferred types of the plasticizer include polyethylene glycol 400 bis(2-ethyl hexanote), methoxypolyethylene glycol 550 (2-ethyl hexanoate), and tetraethylene glycol bis(2-ethyl hexanoate). The amount of plasticizer C should 1–10 wt %, preferably 2–8 wt %, with respect to the total weight of the resin composition. If this amounts is less than 1 wt %, it is impossible to realize the crystallization rate and molding temperature needed for realizing the synergistic effect with the polyalkylene oxide soft segment component. On the other hand, if this amount is greater than 10 wt %, it is impossible to maintain the same mechanical characteristics as those of the polyethylene terephthalate.

According to this invention, component D is a crystallization promoter. The crystallization promoter is derived from (a) at least one source of carboxyl groups selected from the group consisting of hydrocarbon acids containing 7–54 carbon atoms and organic polymers having at least one carboxyl group attached thereto, (b) at least one source of metal ions capable of reacting with the carboxyl groups of (a) selected from the group consisting of sodium and potassium ion sources, where the concentration of said metal in said matrix resin (A) is at least 0.01 weight percent, (c) inorganic alkali metal salts, and (d) mixtures of (a), (b), and (c).

Crystallization promoters include, but are mot limited to, a sodium salt or potassium salt of a carboxylated organic polymer, such as the sodium salt or potassium salt of the copolymer of an olefin and acrylic acid or methacrylic acid and the copolymer of an aromatic olefin and maleic anhydride. Preferred types include the sodium salt or potassium salt of ethylene/methacrylic acid copolymer (includes both completely neutralized salt or partially neutralized salt, such as a mixture of both salts with at least about 30% neutralized salt), the sodium salt of a styrene/maleic anhydride copolymer (includes both completely neutralized salt or partially neutralized salt, such as a mixture of both salts with at least about 30% partially neutralized salt), etc. Most preferably, the sodium salt of an ethylene/methacrylic acid copolymer.

In the aforementioned copolymer, the content of the olefin or aromatic olefin portion is usually 50–98 wt %, preferably 80–98 wt % with respect to the copolymer. The copolymer can also be manufactured using conventional high-pressure polymerization technology. According to this invention, it is also possible to make use of other nucleating agents in place of the sodium salt or potassium salt of carboxylated organic polymers and hydrocarbon acids. A portion or all of the polyester that is the main component of the resin composition of this invention may be substituted by a polyester with sodium or potassium bonded to its terminals. Such a terminal-processed polyester is disclosed in U.S. Pat. No. 4,425,470, and it can be manufactured using the method disclosed in this Patent. The content of component D, that is, the sodium salt or potassium salt of a carboxylated organic polymer or hydrocarbon acid, should be 1–10 wt %, preferably 1–6 wt %. If the content is less than 1 wt %, the crystallization rate is generally insufficient. On the other hand, if the content is greater than 10 wt %, the mechanical characteristics may be degraded.

Examples of the acids (fatty acids) of the sodium salt or potassium salt of hydrocarbon acid D include stearic acid, pelargonic acid, behenic acid, and montanic acid. Inorganic alkali metal salts, such as sodium or potassium carbonate, sodium or potassium oxazolate, and trisodium or tripotassium sodium phosphate, may also be used as crystallization promoters.

Acceptable crystallization promoters are also described in U.S. Pat. No. 4,548,978.

In addition, in order to improve the impact strength and heat shock property for the polyester resin composition of this invention, to the aforementioned components A, B, C, and D may be added an ethylene copolymer represented by the formula:

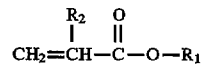

where

E represents ethylene,

X represent the group generated by formula:

$$\overset{R_2}{\underset{|}{CH_2}}=CH-\overset{O}{\underset{\|}{C}}-O-R_1$$

$R_1$=$C_{1-8}$ alkyl group
$R_2$=H, $CH_3$, or $C_2H_5$
where Y represent glycidyl methacrylate or glycidyl acrylate.

The proportion of E is 40–90 wt %, the proportion of X is 10–40 wt %, and the proportion of Y is 0.5–20 wt%. The amount of this ethylene copolymer should 1–15 parts by weight with respect to 100 parts by weight of the total amount of said components, A, B, C, and D. It is preferred that in said formula, $R_1$ represent a $C_4$ alkyl group, $R_2$ represent H, and Y represent glycidyl methacrylate. This type of [co]polymer is disclosed in Japanese Kohyo Patent No. Sho 61[1986]-501270. When the content of this type of copolymer is less than 1 wt %, the impact strength and elongation may be improved. On the other hand, when it is larger than 15 wt %, the heat resistance may be degraded. This is undesired as well.

In addition, the resin composition of this invention may also contain glass fibers, mica, whiskers, synthetic resin fibers, and/or other fillers.

Also, in addition to the aforementioned components, provided that their amounts do not lead to significant degradation of the characteristics of the polyester resin composition of this invention, it is also possible to add thermal stabilizers, plasticizers, oxidation inhibitors, dyes, pigments, mold-release agents, and other additives.

The polyester resin composition of this invention may be manufactured using a melt-blending method. Conventional blending equipment, such as a Banbury mixer, extruder, various kneaders, etc., may be used in this case. When the polyester resin composition of this invention is manufactured, the blending order may correspond to a process in which all of the components are blended at once, or in which the fillers or other additives are fed in from a side feeder.

The resin composition of this invention contains prescribed amounts of a polyalkylene oxide soft segment component, a certain type of plasticizer and a certain type of nucleating agent. Consequently, due to their synergistic effect, the crystallization rate is increased, low-temperature molding can be performed on the composition, and moldings formed exhibit excellent surface gloss. In addition, by maintaining these components and the flame resistant agent at appropriate amounts, it is possible to form a flame resistant polyester resin composition while maintaining the mechanical characteristics intrinsic to the polyester.

Also, by containing a prescribed amount of ethylene copolymer, it is also possible to improve the impact strength and the heat shock property.

fiber, 0.3 weight percent antioxidant, 0.6 weight percent Epon 1009 F, 0.8 weight percent PED, and 1.5 weight percent antimony compound.

After the components for each composition were premixed for 20 min. in a tumbler, melt-blending was performed in a biaxial extruder (Toshiba TEM 35 B) at a temperature of 290° C. to form a resin composition. The obtained resin composition was used to mold specimens measuring 13 mm×130 mm×3.2 mm according to ASTM D638. The specimens obtained were used to make measurements of the mechanical characteristics. The measurements were carried out using the following test methods.

Tensile Strength: ASTM D638-58T

Elongation: ASTM D638-58T

Flexural Modulus: ASTM D790-58T

Notched Izod Strength: ASTM D256-56

Flame resistance was measured via UL94.

The results are listed in Table I.

In these application examples and comparative examples, the following components were used.

PET: Polyethylene terephthalate with intrinsic viscosity of about 0.67–0.58 (product of E. I. du Pont de Nemours and Company).

PET/PEO copolymer (PEO content of 15%).

Flame Resistant Agent: Polytribromostyrene (Pyrochek 68 PB, MW 150,000–170,000, product of Ferro Co.).

Plasticizer: Polyethylene glycol di-2-ethyl hexoate.

Nucleating Agent: Sodium salt of 85/15 ethylene/methacrylic acid copolymer (Surlyn®, product of E. I. du Pont De Nemours and Company).

Toughener: 65/35/5 ethylene/butyl acrylate/glycidyl methacrylate (product of E. I. du Pont de Nemours and Company).

TABLE I

|  | Application Example 1 | Application Example 2 | Application Example 3 | Comparative Example 1 | Comparative Example 2 | Comparative Example 3 | Comparative Example 4 |
| --- | --- | --- | --- | --- | --- | --- | --- |
| PET wt % | 24 | 21 | 21 | 43 | 0 | 27 | 15 |
| PET/PEO Copolymer (wt %) | 21 | 18 | 18 | 0 | 41 | 23 | 14 |
| Flame Resistant Agent (wt %) | 14 | 20 | 16 | 14 | 18 | 4 | 30 |
| Plasticizer (wt %) | 4 | 4 | 4 | 3 | 4 | 4 | 4 |
| Nucleating Agent (wt %) | 4 | 4 | 4 | 4 | 4 | 4 | 4 |
| Toughener (wt %) | 0 | 0 | 5 | 0 | 0 | 0 | 0 |
| Tensile Strength (kg/cm$^2$) | 1210 | 1150 | 970 | 1350 | 930 | 1230 | 1100 |
| Elongation (%) | 2.9 | 2.7 | 3.4 | 2.0 | 3.2 | 3.0 | 2.0 |
| Flexural Modulus (kgf/mm$^2$) | 85000 | 88000 | 71000 | 100000 | 61000 | 84000 | 87000 |
| Notched Izod Strength (kg · cm/cm) | 10.2 | 9.5 | 12.2 | 9.5 | 11.2 | 10.5 | 6.5 |
| Surface Gloss | Good | Good | Good | Bad | Good | Good | Acceptable |
| Flame Resistance (1/32") | V-O | V-O | V-O | V-O | V-1 | HB | V-O |
| Burn Time (sec) | 8 | 12 | 18 | 10 | 63 | >200 | 6 |

EXAMPLES

Application Examples

In the following, this invention will be explained in more detail with reference to application examples. However, this invention is not limited to these application examples.

Application Examples 1–3, Comparative Examples 1–4

The compositions tested are described in Table I below. Each composition also contained 30 weight percent glass The specimens obtained in all of the application examples displayed excellent surface gloss, as well as A flame resistance of V-O. In Application Example 3, a certain ethylene copolymer was added and the notched Izod strength and elongation were also improved. In Comparative Example 1, as polyethylene oxide was not added, it was impossible to obtain a good surface gloss. In Comparative Example 2, the content of polyester resin was small and the content of polyethylene oxide was large; although the surface gloss was good, it was impossible to obtain a flame resistance of V-O. In Comparative Example 3, the content of flame resistant agent was small, and thus the resin composition was rated HB in flammability. In Comparative Example 4, the content of flame resistant agent was too large, the notched Izod strength decreased, and the surface gloss was unsatisfactory.

As explained above, for the polyester resin composition of this invention, the crystallization rate is high. Consequently, the thin-film strength and the thin-film portion's resin flow property are good. In addition, the impact strength and the heat flock property are excellent. Consequently, the pin holding strength can be increased. Also, it allows for low-temperature molding to be possible.

I claim:

1. A flame resistant polyester resin composition essentially comprising:
   (A) 20–80% by weight based on the total weight of components A, B, C, and D of a polyester matrix comprised of
      (A)(1) a polyester resin selected from the group consisting of polyethylene terephthalate, polyethylene terephthalate/polybutylene terephthalate blends, polyethylene terephthalate/polybutylene terephthalate copolymers, and blends thereof (with the proviso that the blends and copolymers contain at least 70% by weight of ethylene terephthalate units) and
      (A)(2) a polyalkylene oxide soft segment component having a molecular weight of 200–3,250,
   wherein 1–10 parts by weight of the soft segment component is incorporated per 99–90 parts by weight of the polyester resin;
   (B) 14–25% by weight of a brominated flame retardant;
   (C) 1–10% by weight of a plasticizer represented by the Chemical Formula:

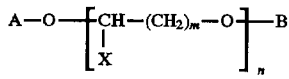

wherein m=1–3; n=4–25; A=$C_1$–$C_{10}$ alkyl, acyl, or aroyl; B=$C_1$–$C_{10}$ alkyl, acyl, or aroyl; and X=H, $CH_3$, or $C_2H_5$; and
   (D) 1–10% by weight of a crystallization promoter derived from the group consisting of
      (D)(1) at least one source of carboxyl groups selected from the group consisting of hydrocarbon acids containing 7–54 carbon atoms and organic polymers having at least one carboxyl group attached thereto,
      (D)(2) at least one source of metal ions capable of reacting with the carboxyl groups of (D)(1) selected from the group consisting of sodium and potassium ion sources, where the concentration of said metal in said matrix resin (A) is at least 0.01 weight percent,
      (D)(3) an inorganic alkali metal salt, and
      (D)(4) mixtures of (D)(1), (D)(2), and (D)(3).

2. The flame resistant polyester resin composition of claim 1 further comprising an ethylene copolymer (E) represented by the formula:

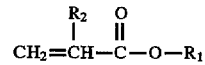

where E is ethylene; X is a group generated from a group represented by Chemical Formula:

$$CH_2=CH-\overset{R_2}{\underset{|}{C}}-\overset{O}{\underset{\|}{}}-O-R_1$$

$R_1$=$C_{1-8}$ alkyl and $R_2$=H, $CH_3$, or $C_2H_5$; Y is glycidyl methacrylate or glycidylacrylate, in amounts of 40–90% by weight of (E), 10–40% by weight of X, and 0.5–20% by weight of Y, with the amount of (E) being 1–15 parts by weight per 100 parts by weight of the total of components (A), (B), (C), and (D).

3. The time resistant polyester composition of claim 1 further comprising at least one component selected from the group consisting of reinforcing and filling materials.

4. The composition of claim 3 wherein the reinforcing and filling materials are selected from the group consisting of glass fibers, graphite fibers or particles, aramid fibers, glass beads, aluminum silicate, asbestos, mica, and calcium carbonate.

* * * * *

UNITED STATES PATENT AND TRADEMARK OFFICE
CERTIFICATE OF CORRECTION

PATENT NO. : 5,700,857
DATED : Dec. 23, 1997
INVENTOR(S) : Atsushi Mukohyama

It is certified that error appears in the above-identified patent and that said Letters Patent is hereby corrected as shown below:

Claim 3, line 1, delete "time", and insert --flame--.

Signed and Sealed this

Fourteenth Day of April, 1998

Attest:

BRUCE LEHMAN

Attesting Officer    Commissioner of Patents and Trademarks